US007553016B2

(12) United States Patent
Tabacchi

(10) Patent No.: US 7,553,016 B2
(45) Date of Patent: Jun. 30, 2009

(54) LENS FOR SPECTACLES AND SPECTACLES COMPRISING THE LENS

(75) Inventor: Massimiliano Tabacchi, Padua (IT)

(73) Assignee: Safilo Societa Azionaria Fabbrica Italiana Lavorazione Occhiali S.p.A., Pieve di Cadore (IT)

( * ) Notice: Subject to any disclaimer, the term of this patent is extended or adjusted under 35 U.S.C. 154(b) by 67 days.

(21) Appl. No.: 11/791,404

(22) PCT Filed: Nov. 29, 2004

(86) PCT No.: PCT/IT2004/000663

§ 371 (c)(1),
(2), (4) Date: May 23, 2007

(87) PCT Pub. No.: WO2006/057015

PCT Pub. Date: Jun. 1, 2006

(65) Prior Publication Data

US 2007/0296913 A1 Dec. 27, 2007

(51) Int. Cl.
*G02C 1/02* (2006.01)
*G02C 7/02* (2006.01)
*G02C 5/00* (2006.01)

(52) U.S. Cl. .......................... 351/110; 351/159; 351/41

(58) Field of Classification Search .................. 351/41, 351/44, 159, 163–177; 2/12, 13, 15, 426; D16/300–329
See application file for complete search history.

(56) References Cited

U.S. PATENT DOCUMENTS

| | | | | |
|---|---|---|---|---|
| 5,208,614 | A | 5/1993 | Jannard et al. | |
| 5,604,547 | A | 2/1997 | Davis et al. | |
| 5,825,455 | A * | 10/1998 | Fecteau et al. | 351/159 |
| 6,224,206 | B1 * | 5/2001 | Schwartz | 351/44 |
| 6,227,664 | B1 * | 5/2001 | Pavlak | 351/62 |

FOREIGN PATENT DOCUMENTS

| | | |
|---|---|---|
| EP | 0 093 699 | 11/1983 |
| WO | WO 92/06399 | 4/1992 |
| WO | WO 03/050596 | 6/2003 |

OTHER PUBLICATIONS

International Search Report for PCT International Application No. PCT/IT2004/000663, mailed Aug. 10, 2005.

* cited by examiner

*Primary Examiner*—Darryl J Collins
*Assistant Examiner*—Zachary Wilkes
(74) *Attorney, Agent, or Firm*—RatnerPrestia

(57) ABSTRACT

A lens for spectacles is described which is delimited by a first and a second lens surface which are spaced apart from and located opposite each other, the first surface being arranged to face towards the inner side of the spectacles, near the face of the user when the spectacles are worn, the second opposite surface facing towards the opposite outer side of the spectacles, first cross-sectional curves being defined on the lens by the intersection of the first and second lens surfaces with a plane which is transverse to the lens and intersects a straight line joining the eyes of the user, in which the first cross-sectional curves have negative curvature with the concavity directed towards the outer side of the spectacles.

12 Claims, 4 Drawing Sheets

LENS FOR SPECTACLES AND SPECTACLES COMPRISING THE LENS

This application is a U.S. National Phase Application of PCT International Application PCT/IT2004/000663 which is incorporated by reference herein.

TECHNICAL FIELD

The present invention relates to an improved lens for spectacles in accordance with the preamble of claim 1. The invention also relates to spectacles comprising the above-mentioned lens.

TECHNOLOGICAL BACKGROUND

The invention is particularly, though not exclusively, intended for the specific technical field of protective glasses, such as, for example, sunglasses, for use in a great variety of sporting activities or more simply intended for use during recreation and in any activity in which the eyes need to be protected. In this field, for example, spectacles having a more or less markedly wrap-around shape are widespread and allow, on the one hand, suitable wrapping of the lens surface around the face, in particular in the opposing lateral zones, and, on the other hand, the construction of lens and frame geometries which are particularly aesthetically attractive.

DISCLOSURE OF THE INVENTION

The main object of the present invention is to provide a structural and functional improvement of the lenses arranged for being mounted on spectacles which are intended for the above-mentioned use, and in particular which are capable of improving the comfort of the user when the spectacles are being used and, at the same time, bring about an attractive aesthetic effect.

This object and other objects further set out below are achieved by the invention by means of lenses and spectacles produced in accordance with the appended claims.

BRIEF DESCRIPTION OF THE DRAWINGS

The features and advantages of the invention will become clear from the following detailed description of two preferred embodiments thereof which are illustrated purely by way of non-limiting example with reference to the appended drawings, in which.

PREFERRED EMBODIMENT OF THE INVENTION

First with reference to FIGS. 1 to 5, a first embodiment of a lens for spectacles is generally designated 1 and is constructed in accordance with the present invention.

The lens 1, as illustrated in the above-mentioned Figures, is arranged as a left lens, that is to say, suitable for being mounted on spectacles for protecting the left eye. It will be understood that the invention is also applicable to the corresponding and specular right lens which is provided on spectacles for protecting the right eye, but only the left lens will be described in detail below.

The lens 1 is delimited by a pair of surfaces which define the lens thickness S, a first surface 2 and a second opposite surface 3, respectively. The surface 2 will otherwise be referred to as the inner lens surface, because it is directed towards the inner side of the spectacles when they are worn, in a position facing the face of the user. Similarly, reference will also be made to the opposite surface 3 by means of the term "outer surface" because it faces the opposite outer side of the spectacles.

According to a main feature of the invention, the lens 1 has curvature having a concave shape in any vertical plane, as explained in detail below, with the concavity directed towards the outer side of the spectacles (therefore, dissimilar to lenses of conventional type).

Figure 1:
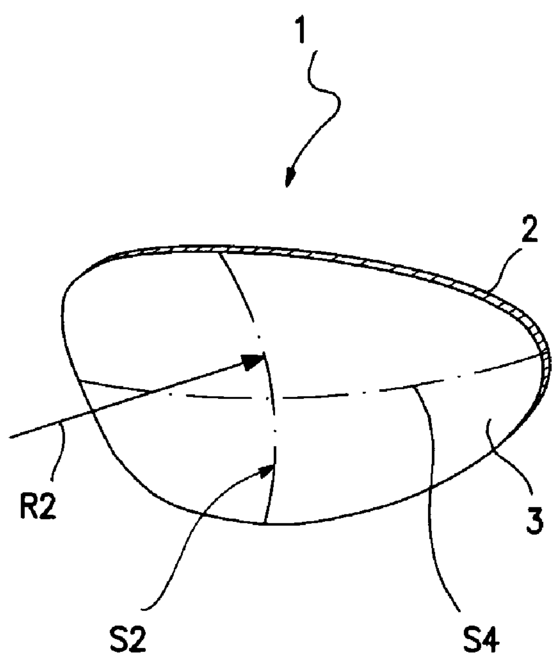
FIGS. 1 and 2 are perspective views of a first embodiment of a lens constructed in accordance with the present invention.
Figure 2:
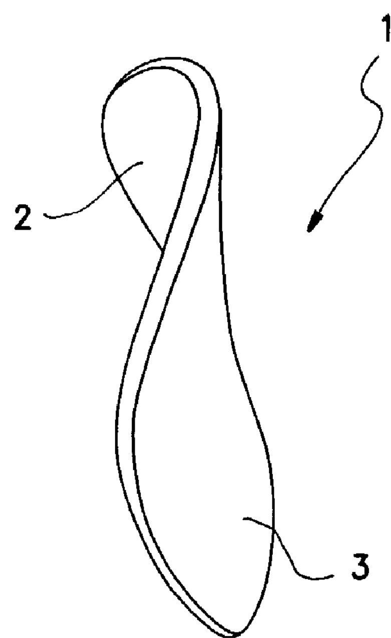

In greater detail, a straight line conventionally joining the eyes of the user, which are schematically illustrated and indicated O, is designated R, and any plane transverse to the lens 1 and intersecting the straight line R is designated P. Assuming that, for any plane P intersecting the lens, cross-sectional curves S1 and S2 are identified at the inner surface 2 and outer surface 3, respectively, the curvature of the cross-sectional curves S1 and S2 has negative curvature with the concavity directed towards the outer side of the spectacles. FIG. 1 shows, for the sake of clarity, only the curve S2, whose curvature has a radius of curvature R2 with a centre of curvature C2 located at the outer side of the spectacles. The centres of curvature C1 for the radii of curvature R1 of the curves S1 are also arranged at the outer side of the spectacles.

On the other hand, any longitudinal plane which extends parallel with the straight line R joining the eyes is designated Q. Similarly, for any plane Q which intersects the lens, there are identified cross-sectional curves S3 and S4 at the inner surface 2 and outer surface 3, respectively, the curvature of the cross-sectional curves S3 and S4 having positive curvature with the concavity directed towards the inner side of the spectacles. FIG. 1 shows, for the sake of clarity, only the curve S4, whose curvature has a radius of curvature R4 with a centre of curvature C4 located at the inner side of the spectacles. The centres of curvature C3 for the radii of curvature R3 of the respective cross-sectional curves S3 are also arranged at the inner side of the spectacles.

Figure 4:
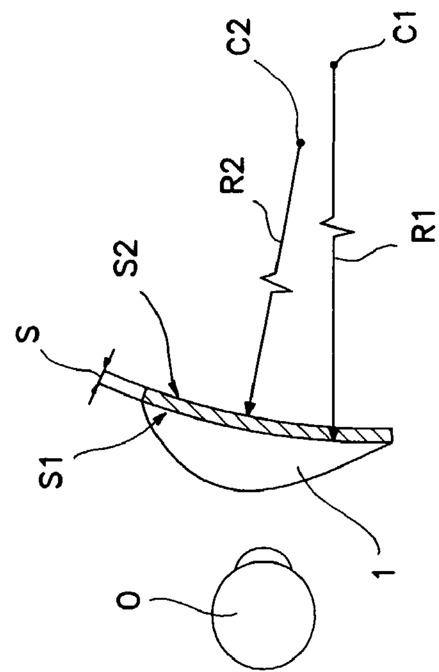

FIG. 4 illustrates the profiles of the cross-sectional curves S1 and S2 which are produced by the intersection of the respective lens surfaces 2 and 3 with a vertical transverse plane P (indicated in FIG. 3 by the sectional line IV-IV) which perpendicularly intersects the straight line R.

Figure 5:
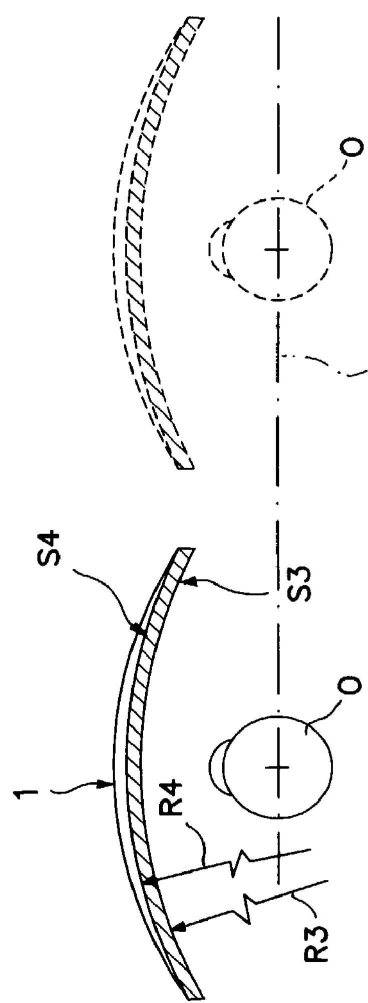
Figure 3:
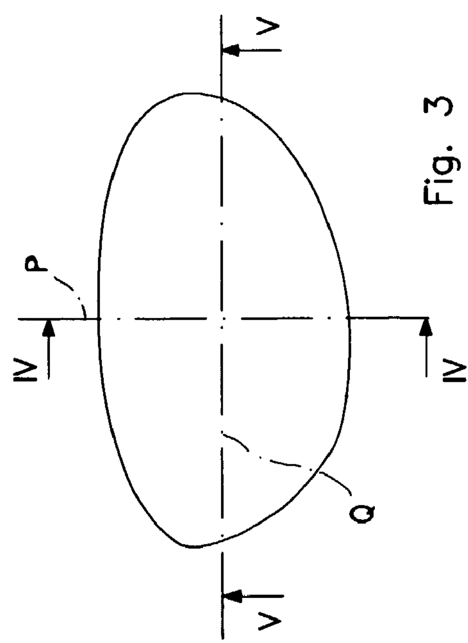
FIG. 3 is a front view of the lens of FIG. 1, FIGS. 4 and 5 are sectioned views of the lens of the preceding Figures, taken on the lines IV-IV and V-V of FIG. 3, respectively.

FIG. 5 illustrates the profiles of the cross-sectional curves S3 and S4 which are produced by the intersection of the lens surfaces 2 and 3 with a horizontal longitudinal plane Q (indicated in FIG. 3 by the sectional line V-V) which perpendicularly intersects the straight line R.

The provision of negative concavity of the lens produces in the spectacles equipped with such lenses, above all in spectacles with a high angle of wrapping at the front, improved capacity for aerodynamic penetration which tends to promote the outflow of incident air in the lateral zones of the spectacles.

Furthermore, this negative concavity causes the upper and lower arched portions of the lens (those extending in the region of the eye-brow arch and in the region of the opposite lower arch) to be moved away from the face of the user (with greater distance away from the face with respect to conventional lenses having positive concavity), consequently allowing a greater circulation of air between the lenses and the face, with increased transpiration and a reduction in misting on the lenses.

Owing to the convex profile of the inner surface of the lens in the vertical plane presented towards the eye, the reflected light which originates from light rays incident on the inner lens surface is directed towards the outer zones of the eye (instead of being conveyed to the eye itself in the case of conventional concave profiles), thereby reducing the action of potential nuisance effect of that reflected light for the user.

The lenses 1 are intended to be mounted in protective spectacles, such as sunglasses for sporting activities, or in general for recreation, therefore lacking corrective lenses for eyesight defects.

Figure 6:
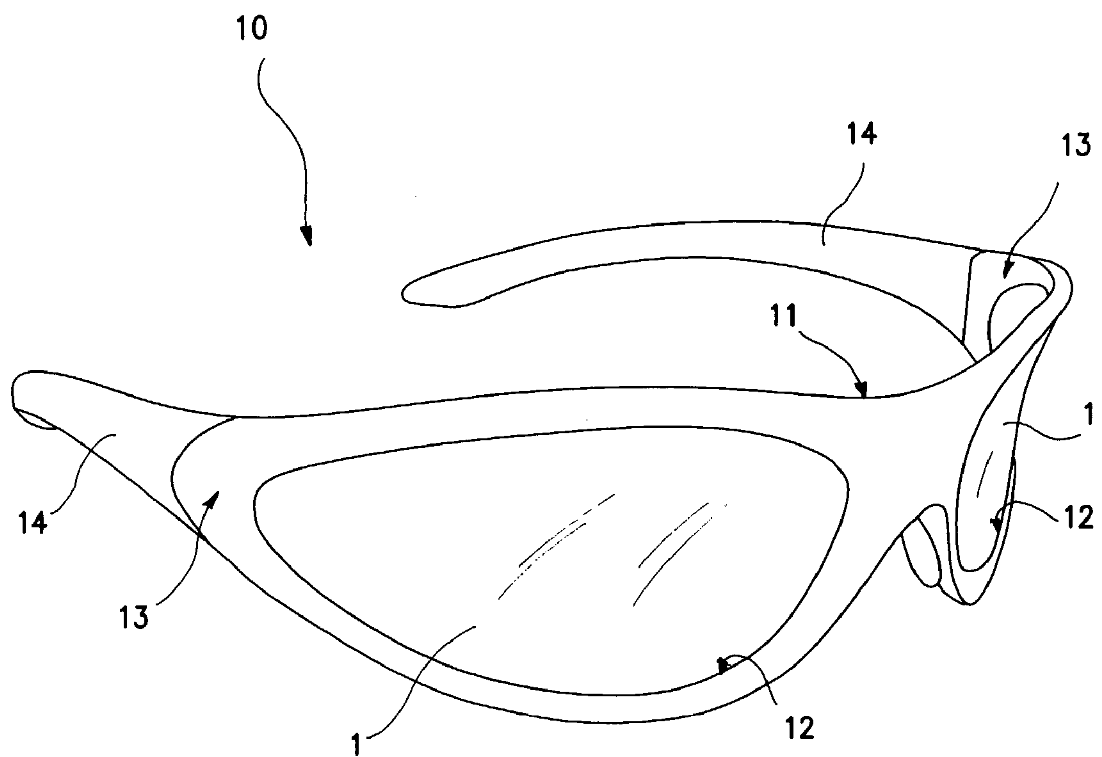
FIG. 6 is a perspective view of a pair of spectacles comprising a pair of right and left lenses constructed according to the invention.
Figure 9:
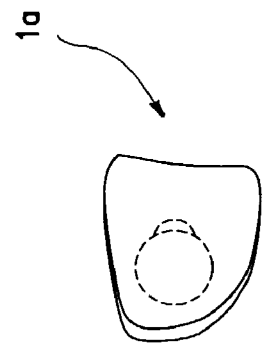
FIG. 9 is a side view of the lens of FIG. 7.
Figure 7:
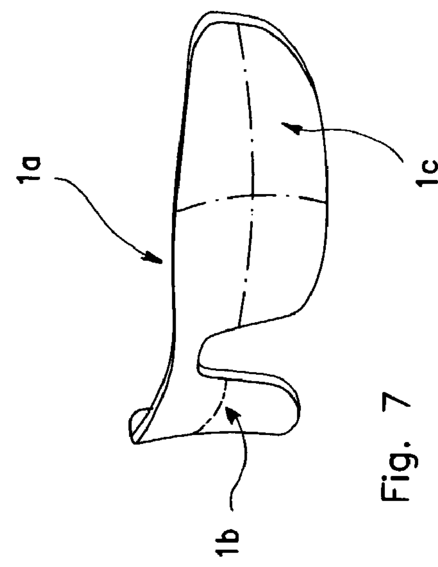
FIG. 7 is a perspective view of a second embodiment of a lens constructed according to the invention.
Figure 8:
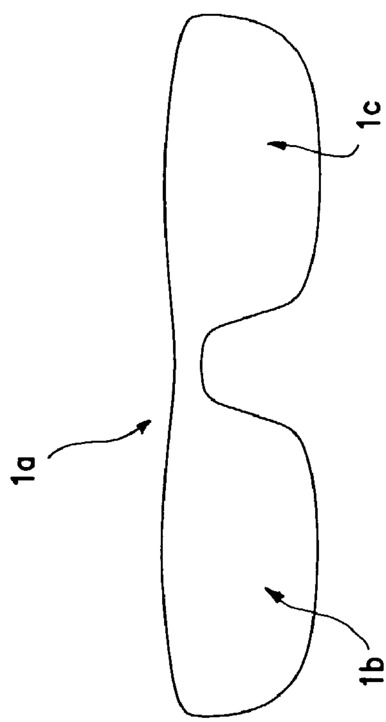
FIG. 8 is a front view of the lens of FIG. 7.
Figure 10:
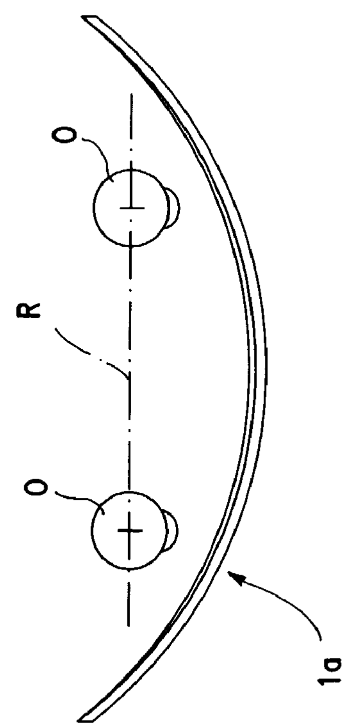
FIG. 10 is a plan view of the lens of FIG. 7.

FIG. 6 illustrates spectacles 10 of the above-mentioned type, comprising a frame 11 which is provided with lens-carrying rims 12 which can hold the right and left lenses 1. Shoulders for articulating respective arms 14 are designated 13 and are arranged at laterally opposing sides relative to the frame and produced in one piece therewith.

It will be appreciated that the lens 1 of the invention is also suitable for assembly in spectacles of the type not having lens-carrying rims, so-called "rimless" spectacles, in which both the shoulders for articulated connection to the arms and the bridge type central connection element for the nose support are fixed directly to the surfaces of the lenses 1.

There may also be provision for the lenses 1 to be able to be readily produced with optional optical decentralisation, of any magnitude, for the purpose of limiting the prismatic effects, in particular in the case of assembly in spectacles with high front wrapping angles, and/or marked curvature in the horizontal plane.

The lens 1 can be produced from any plastics material suitable for applications in the field of optics, or alternatively from glass or similar materials.

When plastics material is used, in particular the lens may be produced by means of injection-moulding, casting or by means of thermoforming. The lens can be constituted by a plurality of layers of different plastics materials, superimposed on top of each other.

The lens can further be subjected to all the surface treatments/coatings which may be necessary in accordance with the requirements during use, of a functional or aesthetic type, which are typically known and applied to the conventional lenses for protection from the sun. This relates to lens coatings of the scratch-resistant, anti-reflective, anti-misting or water-repellent type, or of the mirrored or polarising type. It is also possible to produce lenses according to the invention as coloured lenses with chromatic effects of known type, both by means of coating and by means of the use of constructive materials which are naturally coloured. The above-mentioned treatments/coatings can equally well be directed towards one or both of the surfaces 2 and 3 of the lens, without any limitation at all.

The processing of the lens can be carried out with specific techniques and equipment which are intended for processing the semi-processed lens as far as the shaping of the lens so as to have a definitive profile. In greater detail, those processing operations include cutting out the shape from the semi-finished lens, processing the contour of the lens (with positive or negative chamfering) and any drilling operations or reductions in the profile/thickness of the lens. A piece of equipment for such processing operations includes, for example, a support having a support base of resin (covered in rubber) which is shaped so as to provide a support surface for the lens having a shape and a profile (with the same radii and directions of horizontal and vertical curvature) which correspond to that of the lens surface in contact, in order to allow stable and precise positioning. During processing, both of the automatic type and with manual guidance of the tool, the semi-processed lens is secured to the above-mentioned support by means of suction.

Alternatively, the semi-processed lens can be mechanically secured between two jaws which are shaped identically to the lens.

With reference to FIGS. 7 to 10, a second embodiment of a lens produced in accordance with the present invention is designated 1*a*.

The lens 1*a* differs from that of the preceding embodiment in that it is produced as a single-lens structure, otherwise referred to in the specific sector as a "mask type lens". The mask type lens 1*a* therefore has an integral single-lens structure which extends from an ocular zone 1*b* for protecting the right eye as far as the opposite ocular zone 1*c* for protecting the left eye, as is clearly evident from FIGS. 7 and 8. Each of the above-mentioned ocular zones 1*b*, 1*c* has structural and functional features which are completely identical to those described above with reference to the lens 1, to which reference should therefore be made for any descriptive details.

Thus, the invention achieves the objectives set out by providing a number of advantages over known solutions.

In particular, there should be mentioned the greater comfort obtained by the lens according to the invention owing to improved aerodynamic capacity during lateral outflow of incident air, increased capacity for transpiration and a reduction in misting, as well as a reduction in nuisance owing to light reflected on the inner surface of the lens. In addition to this improved comfort, the advantage is also pointed out that, with the lens according to the invention, overall lens and spectacle geometries having a considerable level of aesthetic attractiveness are obtained.

The invention claimed is:

1. A lens for spectacles which is delimited by a first and a second lens surface which are spaced apart from and located opposite each other, the first surface being arranged to face towards the inner side of the spectacles, near the face of the user when the spectacles are worn, the second opposite surface facing towards the opposite outer side of the spectacles, first cross-sectional curves being defined on the lens by the intersection of the first and second lens surfaces with a substantially vertical plane which is perpendicular to the lens, wherein the first cross-sectional curves have negative curvature with the concavity directed towards the outer side of the spectacles, wherein second cross-sectional curves are defined on the lens by the intersection of the first and second lens surfaces with a substantially horizontal plane which is perpendicular to the lens, such that when the spectacles are worn, the second cross-sectional curves of the lens have a positive curvature with the concavity directed towards the inner side of the spectacles.

2. A lens for spectacles according to claim 1, in which there extends through each point of the first and second lens surfaces at least one of the first and second cross-sectional curves, which have negative and positive curvature, respectively, with centres of radii of curvature located at the outer side and inner side of the spectacles, respectively.

3. A lens for spectacles according to claim 1, constructed as a right or left lens, for spectacles having a pair of lenses which are structurally independent of each other for protecting the right eye and the left eye, respectively.

4. A lens for spectacles according to claim 1, constructed as an integral single-lens structure which is arranged to extend from first zone for protecting the right eye as far as second zone for protecting the left eye, the single-lens structure having in each of the first and second zones the geometric shape of the inner and outer lens surface.

5. A lens according to claim 1, constructed from plastics material.

6. Spectacles comprising at least one lens which is delimited by a first and a second lens surface, which are spaced apart and located opposite each other, the first surface being arranged to face towards the inner side of the spectacles, near the face of the user when the spectacles are worn, the second opposite surface facing towards the opposite outer side of the spectacles, first cross-sectional curves being defined on the lens by the intersection of the first and second lens surfaces with a substantially vertical plane that is perpendicular to the lens, wherein the first cross- sectional curves have negative curvature with the concavity directed towards the outer side of the spectacles, wherein second cross-sectional curves are defined on the lens by the intersection of the first and second lens surfaces with a substantially horizontal plane that is perpendicular to the lens, such that when the spectacles are worn, the second cross-sectional curves of the lenses have a positive curvature with the concavity directed towards the inner side of the spectacles.

7. Spectacles according to claim 6, in which there extends through each point of the first and second lens surfaces at least one of the first and second cross-sectional curves, which have negative and positive curvature, respectively, with centres of radii of curvature located at the outer side and inner side of the spectacles, respectively.

8. Spectacles according to claim 6, comprising a pair of right and left lenses which are structurally independent of each other for protecting the right eye and the left eye, respectively.

9. Spectacles according to claim 8, comprising a frame including a pair of arms, a pair of shoulders for articulating the arms to the frame, which shoulders are coupled with respective lens-carrying rims of the frame.

10. Spectacles according to claim 8, comprising a pair of shoulders for articulating respective arms and a central connecting bridge, the shoulders and the bridge being directly coupled with the respective lenses.

11. Spectacles according to claim 6, in which the lens is in the form of an integral single lens which is arranged to extend from a first zone for protecting the right eye as far as a second zone for protecting the left eye.

12. Spectacles according to claim 11, comprising a pair of shoulders for articulating respective arms, the shoulders being coupled directly with the single-lens structure at laterally opposite sides.

* * * * *